Figure 1:
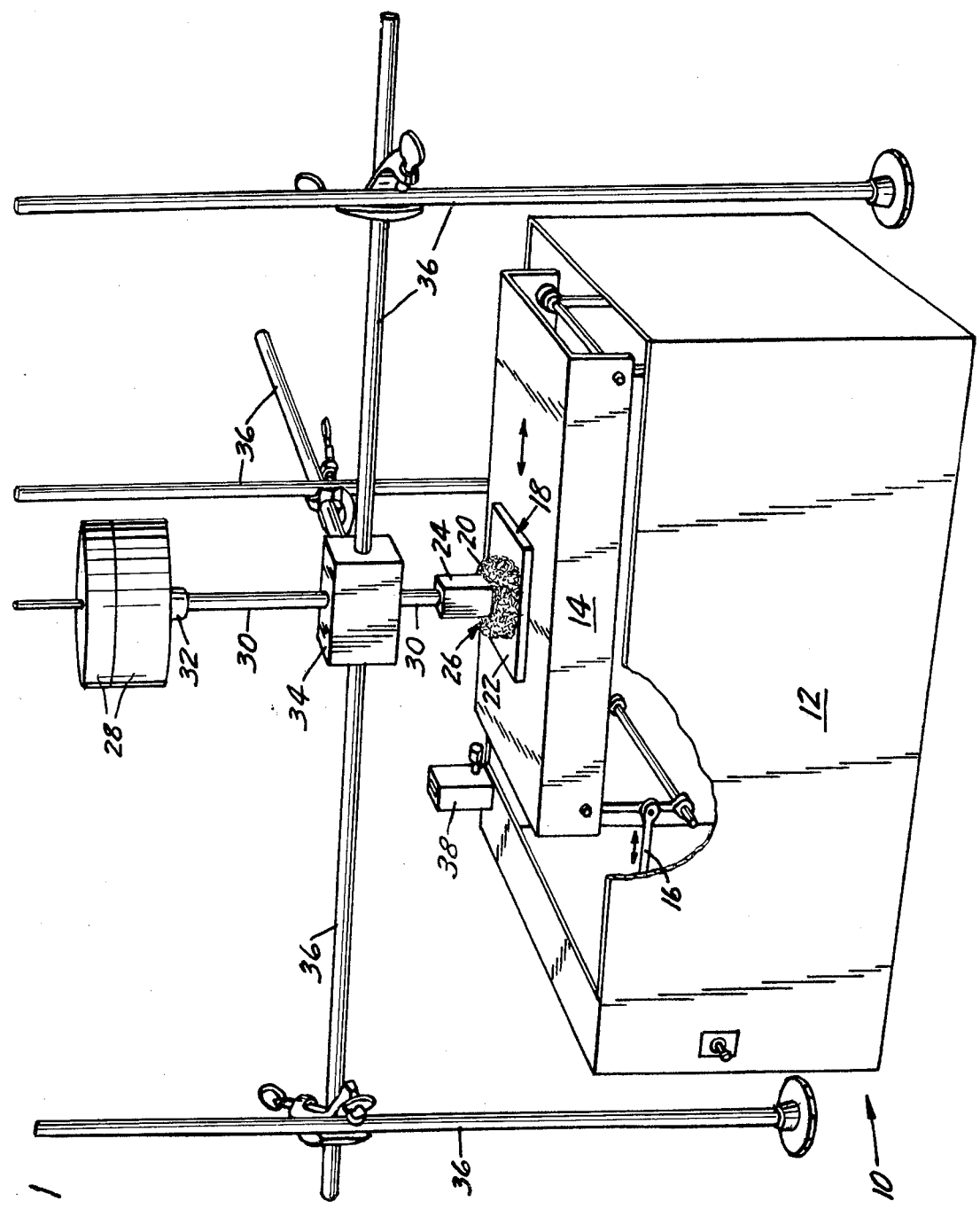

United States Patent [19]

Sandvig

[11] 4,084,021
[45] Apr. 11, 1978

[54] METHOD FOR RENDERING SUBSTRATES RESISTANT TO ABRASION

[75] Inventor: Timothy C. Sandvig, Woodville, Wis.

[73] Assignee: Minnesota Mining and Manufacturing Company, St. Paul, Minn.

[21] Appl. No.: 615,025

[22] Filed: Sep. 19, 1975

Related U.S. Application Data

[63] Continuation-in-part of Ser. No. 513,116, Oct. 8, 1974, abandoned.

[51] Int. Cl.$^2$ .......................... B05D 3/02; B05D 3/06
[52] U.S. Cl. ........................................ 427/44; 427/54; 427/164; 427/165; 427/386; 427/387
[58] Field of Search .................. 427/387, 44, 54, 386, 427/387, 164, 165; 428/447, 429; 260/2, 46, 54

[56] References Cited

U.S. PATENT DOCUMENTS

| 3,219,594 | 11/1965 | Bauford | 260/2 S |
| 3,481,899 | 12/1969 | Norwitz | 428/447 |
| 3,817,905 | 6/1974 | Lerner | 260/2 S |

*Primary Examiner*—James R. Hoffman
*Attorney, Agent, or Firm*—Cruzan Alexander; Donald M. Sell; Mark A. Litman

[57] ABSTRACT

Coatings comprising the reaction product of ambifunctional silanes and organic esters of titanium, aluminum or zirconium are solvent and abrasion resistant and can be readily applied to soft surfaces as a protective coating.

7 Claims, 1 Drawing Figure

U.S. Patent

April 11, 1978

4,084,021

METHOD FOR RENDERING SUBSTRATES RESISTANT TO ABRASION

This application is a continuation-in-part of U.S. Ser. No. 513,116, filed Oct. 8, 1974 and now abandoned.

It is advantageous to protect soft surfaces against abrasion by applying a protective coating to the soft surface. This application relates to new and improved abrasion resistant coatings made from ambifunctional silanes.

Much prior art is available in the area of abrasion resistant coatings, but the most relevant art found has been U.S. Pat. Nos. 3,687,882; 3,637,416; 3,642,681; 3,708,225; 3,460,956; 3,762,981; and 2,768,909; and Japanese Pat. No. 49-117529, issued Nov. 9, 1974. The present invention overcomes some deficiencies of the prior art and displays a high degree of abrasion resistance, little processing (especially no requirement for hydrolysis of substituents), moderate curing temperatures, good corrosion and solvent resistance and exhibit low surface energy to which foreign particles do not readily adhere.

The coatings are applicable to any soft or damageable surface including plastics, natural materials, metals, ceramics and glass.

The process aspect of the present invention is the protection of a substrate by applying to said substrate a thin coating of a composition comprising:

(1) an epoxy-silane, methacryloxy-silane and/or vinyl silane, and (2) a metal ester of aluminum, titanium, or zirconium having at least two ester groups of the formula —OR directly bonded to the metal wherein R is hydrocarbyl of 1 to 18 carbon atoms, and more preferably alkyl or acyl of 1 to 8 carbon atoms. The remaining valences of the metal may be satisfied by organic moieties, inorganic moieties, complexing agents or even repeating —O—Ti—O— groups, etc. (Preferably, if OR groups are not used, halides or alkyl groups are used). As long as two of the ester groups are present, the metal ester can react into the final polymeric structure to form an abrasion resistant coating;
and curing said composition.

It is generally preferred that all valences of the metal are satisfied by ester groups, but the other groups may be present so long as at least two ester groups are present. Compounds of the formula

are therefore useful, wherein R is as defined above, $m$ is the valence of M and $n$ is 0, 1, or 2 such that $m$-$n$ is always at least 2, and R' is an organic or inorganic moiety bonded to M or a complexing agent satisfying the valence requirements of M. Compounds of the formula

are generally preferred because of availability and generally improved characteristics.

It is critical that the metal ester not be hydrolyzed completely or hydrolyzed to a condition where less than two ester groups per titanium atom are present on the metal ester. If the metal ester is so hydrolyzed, the ambifunctional silane and the metal ester will coprecipitate into an insoluble material because reactive sites for the silane on the ester have been removed.

The present coating compositions are prepared simply by the admixing or blending of the metal ester and ambifunctional silane at room temperature (e.g., 25° C.) and allowing the materials to react. Other additives such as leveling agents, colorants and viscosity modifiers may be included by mixing them with the ester and silane. Typically, the coating composition is filtered through a 10 micron filter before application.

It is preferred that the reactants in the coating compositions not be hydrolyzed. Although reactants which are partially hydrolyzed can be used, the amount of water which may be present in the compositions must not be more than one-half equivalent per equivalent of metal ester. For example, use of water over this amount in compositions containing titanium ester results in formation of titanium dioxide which readily precipitates out of the composition. Another disadvantage with the use of hydrolyzed reactant is that an additional step is required in the preparation of the coating compositions. Furthermore, hydrolyzed reactants do not possess the desirable shelf stability exhibited by unhydrolyzed reactants.

Reactive silanes useful in the practice of the present invention include those represented by the following formula:

$$[R^1]_n - Si - [R^2]_{4-n}$$

wherein $R^1$ is selected from a vinyl group, $$CH_2 = CH -$$

a methacryloxy group,

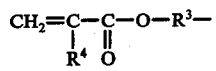

wherein $R^3$ is an alkylene group of 1 to 8 carbon atoms, and $R^4$ is hydrogen or hydrocarbyl radical of 1 to 8 carbon atoms (preferably alkyl) or an epoxy group,

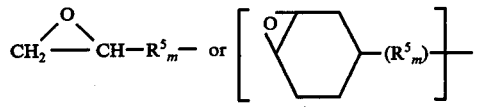

wherein $R^5$ = divalent hydrocarbon radical (aliphatic, aromatic, or aliphatic and aromatic containing) of less than 20 carbon atoms or a divalent radical of less than 20 carbon atoms composed of C, H, N, S, and O atoms (these atoms are the only atoms which may appear in the backbone of the divalent radicals), the last being in the form of ether linkages. No two hetero atoms may be adjacent within the backbone of the divalent hydrocarbon radical. The value of $m$ is 1, 2, or 3 and $n$ is 1 or 2. $R^2$ is an oxyhydrocarbyl group, preferably alkoxy, acyl, or acetoxy, having 1 to 8 carbon atoms or a radical of formula $(CH_2CH_2O)_kZ$ in which $k$ is an integer of at least 1 and Z is an aliphatic hydrocarbon radical of less than 10 carbon atoms or hydrogen. An oxyhydrocarbyl group is a hydrocarbon group or hydrocarbon group having no more than one heteroatom in the backbone selected from N, S, and O for every two carbon atoms in the backbone, wherein a hydrogen attached to a carbon atom has been replaced with a divalent oxygen atom to form an external bond. For example, starting with $CH_3CH_2OCH_3$, the oxyhydrocarbyl derivatives include —O—CH$_2$CH$_2$OCH$_3$. Exemplary hydrocarbyl groups include aromatic groups (e.g., phenyl, naphthyl and benzothienyl) and aliphatic groups (linear, branched, or cyclic) including cyclohexyl, tetrahydrofuryl, dioxanyl, peperidyl, pyrolidinyl, ethoxyethoxy ethyl, etc.) Preferably, this oxyhydrocarbyl group has 1 to 10 carbon atoms.

Examples of useful silanes are vinyltriethoxy silanes, vinyltris(2-methoxyethoxy) silane, vinyltriacetoxy silane, gamma-methacryloxy-propyltrimethoxy silane, beta-(3,4,epoxycyclohexyl) ethyltrimethoxy silane and gamma-glycidoxypropyltrimethoxy silane. Other useful silanes of this type are known to the art. Combinations of these silanes or additions to these silanes of compounds copolymerizable with either functional group of the reactant (silane, epoxy, vinyl or methacryloxy) is anticipated in the practice of this invention.

It has been found that the molar ratios of the metal ester to the reactive silane may be varied depending upon the coating system chosen. For example, in the compositions containing the titanium ester and an epoxy-functional silane, the molar ratio of metal ester to silane may vary from about 1:0.5 to about 1:7 with the most preferred ratio being 1:4. In compositions containing the titanium ester and acryloxy-functional silane, the molar ratio may vary from about 1:3 to about 1:15, while the preferred molar ratio may vary from about 1:3 to about 1:7 with the most preferred ratio being about 1:4. With the compositions containing the titanium ester and vinyl-functional silane, the useful molar ratio of metal ester to silane is about 1:4. Other molar ratios of metal ester to reactive silanes are given in Table I.

TABLE I

| COATING COMPOSITION | MOLAR RATIO METAL ESTER TO REACTIVE SILANE | | |
|---|---|---|---|
| | Useful Range | Preferred Range | Most Preferred Ratio |
| Al-ester/epoxy-functional silane | 1:1 to 1:5 | 1:2 to 1:5 | 1:4 |
| Al-ester/acryloxy-functional silane | 1:1 to 1:10 | 1:2 to 1:5 | 1:4 |
| Zr-ester/epoxy-functional silane | 1:3.5 to 1:4.5 | 1:4 | 1:4 |
| Zr-ester/acryloxy-functional silane | 1:3.5 to 1:4.5 | 1:4 | 1:4 |

Various ingredients may be incorporated into the coating compositions, if desired. For example, pigments or dyes may be incorporated in order to provide a colored coating. Solvents may be added to the coating composition in order to facilitate the addition of solid metal esters. Solvents, or other viscosity modifiers, may also be added to adjust the viscosity of the uncured composition. Various conventional leveling agents may also be added to the coating composition. These may be useful in producing a high quality optical grade coating. Furthermore, various accelerators may be added to the compositions in order to speed the curing process. Fillers and polymeric modifiers may be added.

In order to reduce the viscosity of the coating compositions in the practice of the invention there may be added solvents such as the lower alcohols, lower carboxylic acids, halogenated hydrocarbon solvents, and aromatic solvents. These include ethanol, methanol, tert-butanol, chloroform, methylene chloride, acetic acid, toluene, benzene, xylene, trichloroethane, 1,2-dichloroethane, etc. Other useful solvents of the type described are known to the art. The amount of solvent added is dependent upon the particular metal ester used and the coating viscosity desired.

In order to increase the viscosity of the coating compositions there may be added oligomerized silane in an amount ranging from 1 – 20% by weight of said composition. For example, gamma-methacryloxypropyl-trimethoxysilane which is prepolymerized by a free radical mechanism at 100° C. for about 20 minutes and diluted to a 50% solution in ethyl alcohol is useful in increasing the viscosity of the coating composition by addition thereto.

Leveling agents are also useful in the practice of the invention in that they level ridges formed in the coating during the coating process. Leveling agents which have been found useful in the practice of the present invention include "SF-1023", a silicon based surfactant available from General Electric; "FC-430" and "FC-431", fluorocarbon-based surfactants available from Minnesota Mining and Manufacturing Co., etc. Preferably, these leveling agents are present at about 0.3 weight percent of the coating solution, although more or less may be used if desired. A preferred leveling agent is "SF-1023".

The coating compositions used in this invention may be applied to a wide variety of substrates to impart abrasion resistance, solvent resistance, corrosion resistance and to impart release characteristics to the surface. In general, the type of substrates that may be coated in accordance with this invention include rigid and flexible substrates such as: plastics, glass, metal and ceramics. For example, soft substrates such as plastics can be rendered very mar and abrasion resistant by the practice of this invention. Representative examples include: lenses used in ophthalmic spectacles, sunglasses, optical instruments, illuminators, watch crystals and the like; plastic window glazing; signs and decorative surfaces. Metal surfaces can be rendered resistant to corrosion by the practice of this invention whereby the brilliance of polish may be maintained on decorative metal strips and front surface mirrors. Further, the coating can be colored and be applied to surfaces as a paint.

Those substrates to which the coatings of the invention do not exhibit excellent natural adhesion may nevertheless be readily coated in accordance with this invention, with resultant excellent adhesion thereto, by first modifying the surface thereof. Such modifying techniques include roughening of the surface (e.g., by mechanical means, by solvent, by chemical etching, oxidation, etc.), and by application to such surface of a conventional priming agents.

The coatings of the present invention may be applied to a substrate in any desired thickness. It has been found that coatings of between about 3 to 5 microns offer excellent abrasion resistance. However, thicker coatings (e.g., up to 20 microns or more) may be obtained by applying successive layers of the coating to the substrate. This may be done by applying a layer of the coating composition to the substrate and then partially curing it, for example, by heating it for about one minute at about 75° C. A second layer of the coating may then be applied. This procedure may be repeated until the desired coating thickness is attained. These multiple coatings offer much higher resistance to abrasion than do single coatings.

Various methods may be employed to cure the coatings of the present invention. For example, they may be cured by heat, exposure to ultraviolet light, or exposure to electron beam radiation. The particular method used is dependent upon the coating being applied, and the substrate being coated.

All of the coating compositions will cure when exposed to heat. However, the exposure conditions may vary depending upon the coating composition used. For example, the vinyl-functional and acryloxy-functional silane-metal ester coatings require exposure to temperatures between about 130° C. to 170° C. and preferably, about 150° C. for periods of time between about 30 to 60 minutes. Epoxy-functional silane-metal ester coatings can be cured by exposure to temperatures between 75° C. to 100° C. for periods of time from between about 16 to 40 hours. As the curing temperature is increased the time necessary to cure the composition is decreased.

It has been found that the amount of time necessary to cure these coatings at these temperatures can be materially reduced by the addition of a small amount of an accelerator to the composition. The accelerators have been found useful in the range of from about 0.4 to about 2.5% by weight of the coating composition. Accelerators which have been found useful are the mineral acids such as hydrochloric, nitric, sulfuric, etc. Other acids which have been found useful include boron trifluoride and aluminum trichloride.

All of the coating compositions containing titanium metal esters will cure when exposed to ultraviolet light. It is preferable that the irradiation be carried out in an inert atmosphere such as nitrogen, carbon dioxide, helium, argon, etc. since oxygen inhibits the reaction. The amount of time necessary to completely cure the coatings varies inversely with the intensity of the light. For example, irradiation may be effected by shining a General Electric 275 watt sun lamp through a quartz glass cover into a nitrogen purged chamber containing the coated substrate. The quartz glass cover allows the passage of ultraviolet light in the range of about 2,000 to about 4,000 angstroms. Curing is complete in from 5 to 20 minutes depending upon the distance from the light source to the substrate.

Vinyl-functional and acryloxy-functional silane-metal ester coatings will also cure when exposed to electron beam irradiation. It is desirable to carry out the irradiation in an inert atmosphere such as nitrogen, carbon dioxide, helium, argon, etc. The amount of time necessary to completely cure the coatings varies inversely with the power of the electron beam source. Irradiation may be effected, for example, by passing the coated substrate through a chamber purged with an inert gas into which a stream of electrons is directed. The source of the electron beams may be a Model CB-150 Electro-Curtain available from Energy Sciences, Incorporated, Burlington, Massachusetts. Typically, the coatings are cured in about 4 seconds.

The unexpected resistance to abrasion exhibited by the coatings prepared in accordance with the present invention is shown by the Oscillating Abrader Test. This test is performed on the oscillating abrader apparatus shown in FIG. 1.

The oscillating abrader apparatus 10 comprises shaker table 14 in housing 12. Table 14 is connected to motor driven oscillating means via arm 16. Such oscillating apparatus 10 is commercially available from Eberbach Corporation as Model 6000. Table 14 oscillates at a frequency of 1.25 cycles per second and a stroke of 3.75 cm.

A coated substrate 18 to be tested is first firmly fastened to the top of table 14 by means of double coated tape. Abrasive means 20 is pressed against the coated surface 22 of substrate 18 and is anchored to the base of abrader block 24 by means of double coated tape. Abrasive means 20 comprises 3/0 grade steel wool. The base 26 of block 24 is 2.5 cm. by 2.5 cm. and the portion of abrasive means 20 which is in pressure-contact with surface 22 is therefore about 2.5 cm. by 2.5 cm. The desired abrasive force to be applied is controlled by means of weights 28 supported on rod 30 by means of ring 32. Rod 30 is connected to block 24. Weights 28 are maintained directly above block 24 by means of a suitable bushing 34 held by arms 36, the bushing permitting unrestricted vertical movement while preventing horizontal movement of block 24.

Abrasion resistance is measured by fastening a coated substrate 18 to the top of table 14 as described above and pressing abrasive means 20 against the coated surface 22 and applying a predetermined abrasive force by means of weights 28. The oscillating motion of table 14 is started. The number of complete oscillations is counted by means of counter 38. When 100 cycles (a cycle being one complete forward and back movement) are completed the oscillating table is stopped and the surface 22 of the coated substrate 18 is visually inspected for scratches. Weights 28 are then either increased or decreased incrementally and the procedure is repeated on an unabraded portion of the test sample.

The maximum weight (including block 24, rod 30, ring 32, and weights 28) which can be placed on abrasive means 20 without producing visible scratches on the test sample after 100 cycles is recorded. Since the area of the base of block 24 (and, hence, the abrasive means 20) is one square inch, the abrasion resistance value can also be referred to as pounds per square inch. (1 lb/in$^2$ = 70.4g/cm$^2$).

Adhesion of the cured coatings to the substrate is measured by cutting the cured, coated surface through with a sharp edge in a series of parallel lines about 0.318 cm. apart and then with a similar series of parallel lines at right angles to the first series, also spaced about 0.318 cm. apart. A total of fifty squares are thereby cut through the cured, coated substrate. A section of "Scotch" Brand Magic Transparent Tape No. 810 is firmly pressed into contact with the coated surface so as to cover the entire cross-hatched area. The tape is then rapidly manually stripped from the substrate at a 90° angle to it. Adhesion is rated at 0 to 100 percent. For each square which is removed during the test, the recorded adhesion value is reduced by 2 percent.

The following examples are meant to illustrate, but not limit this invention. Parts and percentages are by weight unless otherwise indicated.

EXAMPLE 1

Tetraisopropyl titanate was added to gamma-methacryloxypropyltrimethoxy silane at a molar ratio of 1:10 and mixed at room temperature. The composition was spin coated onto a sheet of polydiallylglycolcarbonate and cured by exposure to ultraviolet light for 15 minutes.

The 3 to 5 micron coating was smooth, clear, transparent, firmly bonded to the substrate and abrasion resistant.

The experiment was repeated with a molar ratio of 1:4 with comparable results.

EXAMPLES 2 – 8

Aluminum isopropoxide (0.1 mole) was heated (117° – 120° C.) to melting and dissolved in 80 g. toluene heated to 80° C. Dissolution took ½ hour and the solution was filtered through No. 1 Whatman filter paper. The solution was then mixed with gamma-glycidoxypropyltrimethoxy silane in the molar ratios shown in Table II, spin coated onto 5 × 5 × 0.16 cm. sheets of polyallylglycolcarbonate and cured for 16 hours at 85° C. The cured coatings (3 to 5 microns) were clear, smooth, transparent and abrasion resistant.

Table II reports the data for these examples.

TABLE II

| Example | 2 | 3 | 4 | 5 | 6 | 7 | 8 |
|---|---|---|---|---|---|---|---|
| Molar Ratio Metal Ester: Reactive Silane | 1:1 | 1:2 | 1:3 | 1:4 | 1:5 | 1:7 | 1:10 |
| Abrasion Resistance (PSI) | 10 | 15 | 20 | 25 | 20 | 5 | 0 |
| (g/cm²) | 704 | 1056 | 1408 | 1760 | 1408 | 352 | |

EXAMPLES 9 – 18

Aluminum isopropoxide was dissolved as above and added to gamma-methacryloxypropyltrimethoxy silane. This was again spin coated onto the carbonate squares and cured in an oven for 60 minutes at 150° C. All coatings were clear, smooth and transparent. Table III shows their abrasion resistance and adhesion.

TABLE III

| Example | 9 | 10 | 11 | 12 | 13 | 14 | 15 | 16 | 17 | 18 |
|---|---|---|---|---|---|---|---|---|---|---|
| Molar Ratio Metal Ester: Reactive Silane | 1:1 | 1:2 | 1:3 | 1:4 | 1:5 | 1:7 | 1:10 | 1:15 | 1:20 | 1:30 |
| Abrasion Resistance (PSI) | 12 | 30 | 17 | 25 | 12 | 15 | 12 | 10 | 10 | 7 |
| Adhesion (%) | 100 | 100 | 100 | 100 | 100 | 100 | 100 | 100 | 100 | 100 |

EXAMPLE 19

A 5 cm. × 5 cm. × 0.64 cm. sheet of polycarbonate ("Lexan", commercially available from General Electric) is washed with absolute ethyl alcohol and then dried with a lint free towel. A coating solution of the following formula was prepared as described in Example 1.

| | |
|---|---|
| Tetraisopropyl titanate | 2 gm. |
| Gamma-glycidoxypropyltrimethoxy silane | 3 gm. |
| Gamma-methacryloxypropyltrimethoxy silane | 3 gm. |
| HCl (Concentrated) | 4 drops |
| "SF-1023" (silicone leveling agent commercially available from General Electric) | 1 drop |

The solution was spin coated onto the polycarbonate and placed in an oven for 15 minutes at 150° C. The cure was then completed by placing the partially cured substrate into a nitrogen purged chamber and exposing it to ultraviolet light. The cured coating (approximately 3 to 5 microns thick) was clear, smooth, transparent, firmly bonded to the substrate, and very abrasion resistant.

EXAMPLES 20 – 29

Coating compositions are prepared by mixing tetraisopropyl titanate with gamma-methacryloxypropyltrimethoxy silane in a glass beaker at room temperature at various molar ratios. The resulting coating compositions are then spin coated onto polycarbonate and cured as described in Example 19. The cured coatings (approximately 3 to 5 microns thick) are clear, smooth, transparent and firmly bonded to the substrate. They are also very solvent resistant and very corrosion resistant. Results of the abrasion test and adhesion test are shown in Table IV.

TABLE IV

| Example | 20 | 21 | 22 | 23 | 24 | 25 | 26 | 27 | 28 | 29 |
|---|---|---|---|---|---|---|---|---|---|---|
| Molar Ratio Metal Ester: Reactive Silane | 1:1 | 1:2 | 1:3 | 1:4 | 1:5 | 1:7 | 1:10 | 1:15 | 1:20 | 1:30 |
| Abrasion Resistance (PSI) | 2 | 3 | 15 | 30 | 25 | 15 | 14 | 10 | 9 | 3 |
| Adhesion (%) | 100 | 100 | 100 | 100 | 100 | 100 | 100 | 100 | 100 | 100 |

EXAMPLES 30 – 38

Coating compositions are prepared by mixing tetraisopropyl titanate with gamma-glycidoxypropyltrimethoxy silane in a glass beaker at various molar ratios at room temperature. The resulting coating compositions are then spin coated onto polydiallylglycolcarbonate and partially cured by exposure to ultraviolet light as described in Example 1 for 4 minutes at a distance of about 7.5 cm. The cure is then completed by exposure to 85° C. for 16 hours. The coatings were similar to previous coatings of this invention. Results of the abrasion test and adhesion test are shown in Table V.

TABLE V

| Example | 30 | 31 | 32 | 33 | 34 | 35 | 36 | 37 | 38 |
|---|---|---|---|---|---|---|---|---|---|
| Molar Ratio Metal Ester: Reactive Silanes | 1:0.5 | 1:1.5 | 1:4 | 1:5 | 1:6 | 1:10 | 1:15 | 1:20 | 1:30 |
| Abrasion | 32 | 32 | 35 | 20 | 18 | 4 | 6 | 3 | 2 |
| Adhesion (%) | 100 | 100 | 100 | 100 | 100 | 100 | 100 | 100 | 100 |

EXAMPLES 39 – 40

Substrates precoated with commercially available abrasion resistant coatings are obtained and tested for abrasion resistance on the oscillating abrader. The results are shown in Table VI.

TABLE VI

| Example | 39 | 40 |
|---|---|---|
| Coating/Substrate | General Electric | du Pont "Abcite", |

TABLE VI-continued

| Example | 39 | 40 |
|---|---|---|
| | "MR-4000", an organic melamine type coating, on "Lexan" Polycarbonate | a silicon fluorocarbon hard coat, on polymethylmethacrylate |
| Pressure required to abrade (PSI) | 2 | 10 |

EXAMPLE 41

A 5 cm. × 5 cm. × 0.16 cm. sheet of polydiallylglycolcarbonate is washed with absolute ethyl alcohol and dried with a lint free towel. A coating composition is prepared in a glass beaker at room temperature and spin coated onto the substrate. The coating composition comprises:

| | |
|---|---|
| Tetraisopropyl titanate | 1.75 gm. |
| Gamma-glycidoxypropyltrimethoxy silane | 6.0 gm. |
| Borontrifluoride ether complex | 4.0 drops |
| Silicone leveling agent (SF 1023) | 1.0 drop |

The coated substrate is partially cured by placing it into a nitrogen purged chamber and exposing it to ultraviolet light as described in Example 1 for 4 minutes at a distance of about 7.5 cm. The cure is completed by exposure to 85° C. for 8 hours. The cured coatings (approximately 3 to 5 microns thick) are clear, smooth, transparent and firmly bonded to the substrate. The coating is also very abrasion resistant (exhibiting an abrasion resistance of 25 PSI on the oscillating abrader), very solvent resistant and very corrosion resistant.

EXAMPLE 42

Zirconiumisopropoxide (33 grams) is dissolved in toluene (167 grams) heated to approximately 75° C. The warm solution is filtered using the Buchner funnel and "No. 1 Whatman" filter paper. A 5 cm. × 5 cm. × 0.16 cm. sheet of polydiallylglycolcarbonate is washed with absolute ethyl alcohol and dried with a lint free towel. A coating composition is then prepared in a glass beaker at room temperature and spin coated onto the substrate. The coating composition comprises:

| | |
|---|---|
| Zirconium isopropoxide-toluene solution | 12.0 gms. |
| Gamma-methacryloxypropyltrimethoxy silane | 6.0 gms. |
| Silicone leveling agent (SF 1023) | 1.0 drop |

The coated substrate is cured by exposure to 140° C. for 60 minutes. The cured coating (approximately 3 to 5 microns thick) is clear, smooth, transparent and is firmly bonded to the substrate. The coating is also abrasion resistant (exhibiting an abrasion resistance of 12 PSI on the oscillating abrader), very solvent resistant and very corrosion resistant.

EXAMPLE 43

A 5 cm. × 5 cm. × 0.16 cm. sheet of polymethylmethacrylate is washed with absolute ethyl alcohol and dried with a lint free towel. A coating solution is then prepared in a glass beaker at room temperature and spin coated onto the substrate. The coating composition comprises:

| | |
|---|---|
| Tetraisopropyl titanate | 1.75 gms. |
| Vinyl-tris-(2-methoxyethoxy)silane ("A-172" commercially available from Union Carbide) | 7.0 gms. |

The coating is cured by electron beam radiation by passing the coated substrate through a chamber purged with nitrogen into which a stream of electron beams is directed. The source of the electron beams is a CB-150 Electro-Curtain available from Energy Sciences, Incorporated, Burlington, Massachusetts. The Electro-Curtain is operated at 10 milliamperes and 150 kilovolts. The coated substrate is exposed to electron beam radiation for 4 seconds. The cured coating (approximately 3 to 5 microns thick) is clear, smooth, transparent and is firmly bonded to the substrate. The coating is also abrasion resistant (exhibiting an abrasion resistance of 10 to 12 PSI on the oscillating abrader), very solvent resistant and very corrosion resistant.

EXAMPLE 44

A coating composition is prepared utilizing partially hydrolyzed tetraisopropyl titanate. The tetraisopropyl titanate is hydrolyzed as follows:
a. 4.7 gms. 37% (concentrated) HCl is added to 67 gms. absolute ethyl alcohol.
b. 28.4 gms. (0.1 mole) tetraisopropyl titanate is added to the above solution.

Hydrolysis takes place at room temperature in about 15 minutes. The following materials are then combined at room temperatures to make the coating solution:

| | |
|---|---|
| Hydrolyzed tetraisopropyl titanate solution | 5.0 gms. |
| Gamma-methacryloxypropyltrimethoxy silane | 6.0 gms. |
| Silicone leveling agent (SF 1023) | 0.26 gms. |

EXAMPLE 45

A 5 cm. × 7 cm. × 0.16 cm. sheet of aluminum was cleaned with an abrasive pad and water then washed with absolute ethanol and dried with a lint free towel. The coating composition of the previous Example was spin coated onto the surface of the aluminum sheet and cured at 150° C. for 60 minutes. The cured coating (approximately 3 to 5 microns thick) was clear, smooth, transparent, abrasion resistant and is firmly bonded to the substrate.

EXAMPLE 46

Polyester sheets are etched with a dilute solution of sulfuric acid in absolute ethyl alcohol. The coating composition of the previous Example was spin coated onto the etched polyester sheets and cured at 150° C. for 60 minutes. The cured coatings (approximately 3 to 5 microns thick) were clear, smooth, transparent, abrasion resistant and firmly bonded to the substrate.

EXAMPLE 47

Sheets of acrylic resin were pretreated by
a. immersion in chloroform for 2 minutes
b. submerging the substrate in dichloromethane (e.g., 30 seconds at 25° C.)
c. roughening the surface of the substrate with fine sandpaper (410 through 600 grit polishing paper)

d. roughening the surface of the substrate with aluminum oxide abrasive powder, each substrate was then coated with the solution of the previous Example and cured at 150° C. for 60 minutes.

The cured coatings (approximately 3 to 5 microns thick) are clear, smooth, transparent, abrasion and solvent and are firmly bonded to the substrate.

EXAMPLE 48

A 5 cm. × 5 cm. × 0.16 cm. sheet of polydiallyl-glycolcarbonate is washed with absolute ethyl alcohol and dried with a lint free towel. A coating solution of the following formula is prepared as described in Example 1.

| | |
|---|---|
| Tetraisopropyl titanate | 2 gms. |
| Gamma-methacryloxypropyl-trimethoxy silane | 6 gms. |
| Silicone leveling agent | 1 drop |

The coating was then flow coated onto the substrate and cured by electron beam radiation as described above. The coating cured in about 8 seconds. The cured coating (approximately 3 to 5 microns thick) is clear, smooth, transparent, abrasion and solvent resistant and was firmly bonded to the substrate.

EXAMPLE 49

A coating composition comprising a 1:4 molar ratio of tetraisopropyl titanate to gamma-methacryloxypropyltrimethoxy silane was prepared as described in Example 1. The coating composition was spin coated onto "Lexan" polycarbonate and cured by exposure to 150° C. for 20 minutes followed by exposure to ultraviolet light as described in Example 1 for 15 minutes at a distance of about 7.5 cm.

The solvent resistance of the cured coating was then checked by forming four to five small pools of solvent on the coated surface of the substrate, allowing said pools to remain on said surface for about 20 minutes, wiping said pools dry, and visually inspecting for damage to the cured coating. When tested according to this procedure, the cured coating was unaffected by the following solvents:

a. Water
b. Ethanol
c. Methanol
d. Acetone
e. 2-Butanone
f. Chloroform
g. Dimethyl formamide
h. HCl (concentrated)
i. Toluene

EXAMPLE 50

A 10 cm. × 10 cm. × 0.013 cm. sheet of polyester film was primed with amidized and epoxidized polybutadiene in methanol. A coating composition was then prepared in a glass beaker at room temperature. The coating comprised:

| | |
|---|---|
| Tetraisopropyl titanate | 2.0 gms. |
| Gamma-glycidoxypropyl-trimethoxy silane | 6.0 gms. |
| Silicone leveling agent (SF 1023) | 1.0 drop |

The coating composition was spin coated onto the primed substrate and partially cured at 75° C. for 1 minute. The coated substrate was cooled to room temperature (e.g., 25° C.) and a second layer of the coating composition spin coated onto the partially cured coating. The multiple coating was cured by exposure to 75° C. for 16 hours.

The cured coating (approximately 8 microns thick) is clear, smooth, flexible, transparent and is firmly bonded to the substrate. The coating is also very abrasion resistant (exhibiting an abrasion resistance of 20 PSI on the oscillating abrader), very solvent resistant, and very corrosion resistant.

EXAMPLES 51-54

These examples show the general usefulness of various forms of metal esters having at least two ester groups per metal atom.

Thirty-six grams of gamma-glycidoxypropyltrimethoxy silane was split into three portions, A, B, and C. To A was added 5.0 g. of triethanolamine chelate of bis titanium isopropoxide

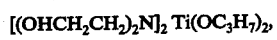
[(OHCH$_2$CH$_2$)$_2$N]$_2$ Ti(OC$_3$H$_7$)$_2$, to B was added 8.5 g. dichlorodialkoxytitanate

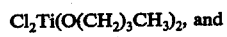
Cl$_2$Ti(O(CH$_2$)$_3$CH$_3$)$_2$, and to C was added 8.0 g. chlorodibutoxy aluminum solution

Cl Al (O(CH$_2$)$_3$CH$_3$)$_2$.

The metal esters of B and C were added as solutions in methylene chloride comprising 25% by weight solids. Two drops of an oligomeric fluorocarbon leveling agent were added as a coating aid.

Coating solution D was made with 6.0 g. gamma-glycidoxypropyltrimethoxy silane and 4.5 g. of a polymeric alkyl titanate having the repeating structure

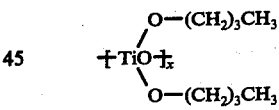

were mixed with one drop of SF1023 (leveling agent). Sheets of polydialylglycolcarbonate (about 7.7×7.7×.16 cm) were washed with absolute ethanol and dried with lint free tissue. The solutions were applied by spin coating to respective sheets and cured in an oven at 85° C. for 16 hours.

The cured coatings in all cases were smooth, transparent, solvent resistant and had very good abrasion resistance to 3/0 steel wool.

What we claim is:

1. A method for rendering a surface of a substrate resistant to abrasion comprising
   (A) applying to said surface of a substrate a composition comprising:
       (1) a metal ester selected from
           (a) a chelate of an ester of titanium, aluminum or zirconium having at least two ester groups of the formula —OR bonded directly to the metal wherein R is hydrocarbyl of 1 to 18 carbon atoms, or (b) a polymeric alkyl titanate having the repeating structure

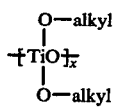

and, (2) an ambifunctional reactive silane selected from epoxy-silane, vinyl silane, and methacryloxy-silane, and (B) curing said composition to an abrasion resistant state.

2. The method of claim 1 wherein said reactive silane comprises an epoxy-silane represented by the formulae:

or

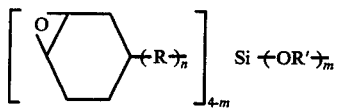

wherein, each R is independently a divalent hydrocarbon radical of less than 20 carbon atoms, or a divalent radical of less than 20 carbon atoms the backbone of which is C atoms which may be interrupted by individual atoms from the group of N, S and O, the O atoms in the form of ether linkages; $m$ is 1, 2, or 3; $n$ is 0 or 1; and R' is hydrocarbyl of 1 to 18 carbon atoms or a radical of the formula $(CH_2CH_2O)_kZ$ in which $k$ is an integer of at least 1, and Z is hydrogen or an aliphatic hydrocarbon radical of less than 10 carbon atoms.

3. The method of claim 1 wherein said reactive silane comprises a methacryloxy silane represented by the formula:

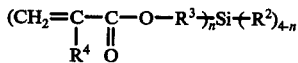

wherein $R^2$ is an oxyhydrocarbyl group of 1 to 18 carbon atoms, $R^3$ is an alkylene of 1 to 8 carbon atoms, $R^4$ is hydrogen or hydrocarbyl of 1 to 8 carbon atoms, and $n$ is 1 or 2.

4. The method of claim 1 wherein the reactive silane comprises a vinyl-silane represented by the formula:

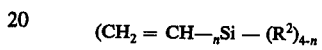

wherein $R^2$ is an oxyhydrocarbyl group and $n$ is 1 or 2.

5. The method of claim 1 wherein said substrate is coated with a priming agent prior to the application of said composition.

6. The method of claim 1 where said cure is effected by exposure to ultraviolet radiation, heating, electron-beam irradiation, or combinations thereof.

7. The method of claim 1 wherein said composition further comprises materials copolymerizable with silanes or the epoxy of said epoxy-silane, the methacryloxy of said methacryloxy-silane, or the vinyl of the vinyl-silane.

* * * * *